US012397456B2

(12) United States Patent
Savage et al.

(10) Patent No.: US 12,397,456 B2
(45) Date of Patent: Aug. 26, 2025

(54) SYSTEMS AND METHODS FOR MONITORING A WIRELESS MOTOR DRIVE CONTROL SYSTEM FOR HANDHELD KNIVES

(71) Applicant: Hantover, Inc., Overland Park, KS (US)

(72) Inventors: Traig William Savage, Midland, MI (US); Ronald J. Curnett, Cross Timbers, MO (US); Jeremy S. Loy, Bridgeport, MI (US); Philip George Bright, Auburn, MI (US)

(73) Assignee: Hantover, Inc., Overland Park, KS (US)

( * ) Notice: Subject to any disclaimer, the term of this patent is extended or adjusted under 35 U.S.C. 154(b) by 773 days.

(21) Appl. No.: 17/534,095

(22) Filed: Nov. 23, 2021

(65) Prior Publication Data

US 2022/0161451 A1 May 26, 2022

Related U.S. Application Data

(60) Provisional application No. 63/116,957, filed on Nov. 23, 2020.

(51) Int. Cl.
*B26B 7/00* (2006.01)
*B26B 11/00* (2006.01)
(Continued)

(52) U.S. Cl.
CPC .............. *B26B 7/00* (2013.01); *B26B 11/008* (2013.01); *B26B 25/002* (2013.01);
(Continued)

(58) Field of Classification Search
CPC ....... B26B 7/00; B26B 11/008; B26B 25/002; G06K 19/0703; G06K 19/0715;
(Continued)

(56) References Cited

U.S. PATENT DOCUMENTS 3,197,687 A 7/1965 Vaucher
3,509,441 A 4/1970 Welch
(Continued)

FOREIGN PATENT DOCUMENTS

CN 102074932 5/2011
CN 107294466 A 10/2017
(Continued)

OTHER PUBLICATIONS

European Search Report for European Application No. EP 21895834.6 (May 2, 2024).
(Continued)

*Primary Examiner* — David Luo
(74) *Attorney, Agent, or Firm* — Hovey Williams LLP

(57) ABSTRACT

A power pack for a power tool. The power pack includes an electric motor configured for driving engagement with the power tool. The power pack also includes a motor controller having a relay circuit connected a electric motor. The relay circuit includes has a switch selectively connected to a power supply. The power supply powers the electric motor. The motor controller also includes non-transitory computer-readable storage media having computer-executable instructions for monitoring operation of the stored power pack. When executed by at least one processor, the computer-executable instructions cause the at least one processor to: monitor input data relating to operation of the power pack; determine, based on the input data, that operation of the power pack deviated from an ideal state; and, based on the determination of deviation, cause the switch to electrically disconnect the electric motor from the power supply.

8 Claims, 7 Drawing Sheets

(51) Int. Cl.
  *B26B 25/00* (2006.01)
  *G06K 19/07* (2006.01)
  *G06K 19/077* (2006.01)
  *H02K 7/14* (2006.01)

(52) U.S. Cl.
  CPC ..... *G06K 19/0703* (2013.01); *G06K 19/0715* (2013.01); *G06K 19/07798* (2013.01); *H02K 7/145* (2013.01)

(58) Field of Classification Search
  CPC .... G06K 19/07798; H02K 7/145; H02P 3/12; H02P 3/22; H02P 29/024
  USPC .................................................. 318/3; 361/23
  See application file for complete search history.

(56) References Cited

U.S. PATENT DOCUMENTS

| | | | |
|---|---|---|---|
| 4,179,646 A | 12/1979 | Russell | |
| 5,247,231 A | 9/1993 | Glucina | |
| 7,368,889 B2 * | 5/2008 | Youm | H02P 3/22 318/801 |
| 8,265,890 B2 * | 9/2012 | Suzuki | H02J 7/00 702/63 |
| 8,907,599 B2 * | 12/2014 | Koral | H02P 3/22 188/73.1 |
| 9,893,674 B2 * | 2/2018 | Ikai | H02P 29/025 |
| 10,335,965 B2 | 7/2019 | Loehnert | |
| 2006/0074405 A1 | 4/2006 | Malackowski et al. | |
| 2006/0087286 A1 | 4/2006 | Phillips et al. | |
| 2010/0141207 A1 | 6/2010 | Phillips et al. | |
| 2013/0326886 A1 | 12/2013 | Levsen | |
| 2014/0184397 A1 | 7/2014 | Volpert | |
| 2014/0313621 A1 | 10/2014 | Innes et al. | |
| 2017/0288583 A1 | 10/2017 | Ma et al. | |
| 2019/0113576 A1 | 4/2019 | Saito et al. | |
| 2020/0039339 A1 | 2/2020 | Naya et al. | |

FOREIGN PATENT DOCUMENTS

| | | |
|---|---|---|
| DE | 102017131460 | 12/2018 |
| EP | 0689905 | 8/1997 |
| EP | 3675348 | 7/2020 |
| JP | H069884 | 2/1994 |
| JP | 2012016540 | 3/2012 |

OTHER PUBLICATIONS

European Search Report for European Application No. EP 23179312.6 (Oct. 2, 2023).
Office Action from U.S. Appl. No. 17/534,081, filed Nov. 23, 2021 (dated Aug. 31, 2023).
European Search Report for European Application No. EP 23179330.8 (Nov. 8, 2023).
International Search Report and Written Opinion for PCT Application No. PCT/US21/60617 (Mar. 17, 2022).
Office Action from CNIPA Patent Application No. 202180078102.3 (dated Jul. 16, 2025).

* cited by examiner

SYSTEMS AND METHODS FOR MONITORING A WIRELESS MOTOR DRIVE CONTROL SYSTEM FOR HANDHELD KNIVES

RELATED APPLICATIONS

This patent application claims priority to U.S. Patent Application Ser. No. 63/116,957, entitled WIRELESS MOTOR DRIVE CONTROL SYSTEM FOR HANDHELD KNIVES, filed Nov. 23, 2020, the entire contents of which is hereby incorporated herein by reference.

FIELD OF THE INVENTION

The present invention relates generally to powered knives, such as those commonly used in slaughterhouses for meat processing. More specifically, the present invention concerns braking and control components of powered rotary knives.

BACKGROUND

Existing powered rotary knives are often used in the meat processing industry for dressing an animal carcass. The process of dressing a carcass normally involves the removal of meat and fat from, as well as cutting, bones. Powered rotary knives enable workers to perform this process with great efficiency.

However, existing powered rotary knives can be hazardous to operate and control. For example, existing drive control(s) are rudimentary and can lead to unsafe operating conditions. For another example, existing powered rotary knives are often exposed to unnecessary wear and tear due to design flaws, which may render them unsafe or prone to premature failure.

This background discussion is intended to provide information related to the present invention which is not necessarily prior art.

BRIEF SUMMARY

The following brief summary is provided to indicate the nature of the subject matter disclosed herein. While certain aspects of the present invention are described below, the summary is not intended to limit the scope of the present invention.

A first aspect of the present invention concerns a power pack for a power tool. The power pack includes an electric motor configured for driving engagement with the power tool. The power pack also includes a motor controller having a relay circuit in electrical communication with the electric motor. The relay circuit includes a switch selectively electrically connectable to a power supply. Electrical connection of the electric motor to the power supply powers the electric motor. The motor controller also includes non-transitory computer-readable storage media having computer-executable instructions for monitoring operation of the stored power pack. When executed by at least one processor, the computer-executable instructions cause the least one processor to: monitor input data relating to operation of the power pack; determine, based at least in part on the input data, that operation of the power pack deviated from an ideal state; and, based on the determination of deviation, cause the switch to electrically disconnect the electric motor from the power supply.

A second aspect of the present invention concerns a system for selectively powering a power tool. The system includes a power pack with a motor controller and an electric motor configured for driving engagement with the power tool. The motor controller is in electrical communication with the electric motor and includes at least one processor and non-transitory computer-readable storage media having computer-executable instructions for monitoring operation of the electric motor. When executed by the at least one processor, the computer-executable instructions cause the at least one processor to: monitor input data relating to operation of the electric motor; determine, based at least in part on the input data, that operation of the electric motor deviated from an ideal state; and, based on the determination of deviation, electrically disconnect the electric motor from the power supply.

Advantages of these and other embodiments will become more apparent to those skilled in the art from the following description of the exemplary embodiments which have been shown and described by way of illustration. As will be realized, the present embodiments described herein may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

The Figures depict exemplary embodiments for purposes of illustration only. One skilled in the art will readily recognize from the following discussion that alternative embodiments of the systems and methods illustrated herein may be employed without departing from the principles of the invention described herein.

DETAILED DESCRIPTION

Figure 1:
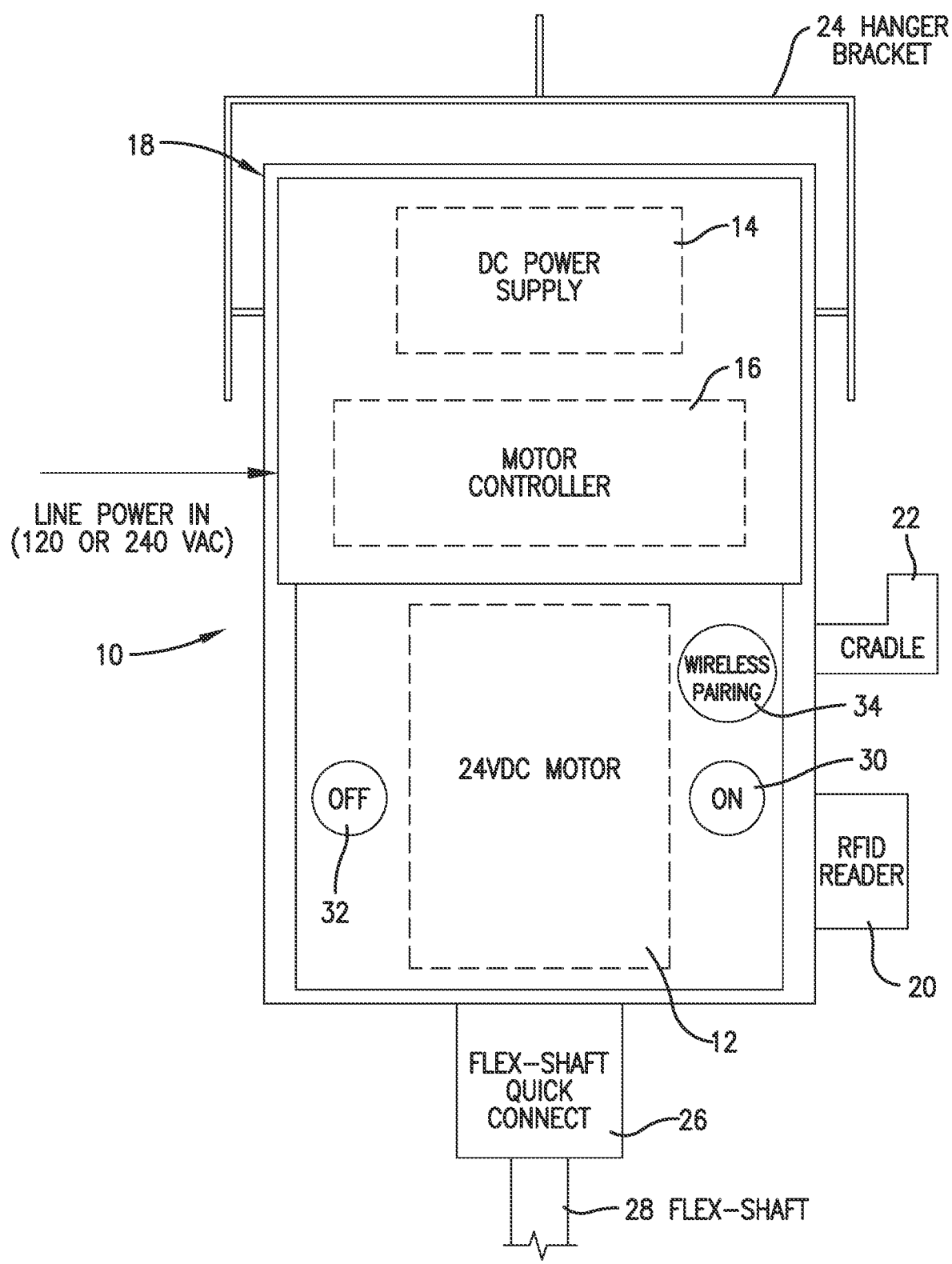
FIG. 1 illustrates, in schematic and block diagram form, components of a power pack, hanger bracket and flex-shaft according to an embodiment of the present invention.

Turning first to FIG. 1, components of an exemplary power pack 10 are illustrated that include a motor 12, a power supply 14, a motor controller 16 and a housing 18. The motor 12 may comprise a direct current (DC) motor powered by, for example, a twenty-four volt (24V) power supply 14. The motor 12 may also include a connection to a ground circuit. In an embodiment, the power supply 14 receives line power (e.g., in one hundred and twenty (120) or two hundred and forty (240) volt alternating current (AC)) and converts the line power to twenty-four volt (24V) power for supply to the motor 12. The line power may also be used to power one or more of the electronic components of the power pack 10 and/or of a handpiece 38 discussed in more detail below. One of ordinary skill will appreciate, as noted above, that a variety of AC and DC motors (including brushless motors), operating with a variety of power supplies, are within the scope of the present invention.

The motor controller 16 may include and/or be in electronic communication with a radio frequency identification (RFID) reader 20. The RFID reader 20 may be housed within the same power pack housing 18 as the motor 12, power supply 14 and/or motor controller 16. The RFID reader 20 may also be positioned outside of and/or attached to the housing 18. The RFID reader 20 may be compatible with one or more of low frequency, high frequency and/or ultra-high frequency tags, and may operate according to passive and/or active classification protocols and components, without departing from the spirit of the present invention.

The power pack 10 may also include a cradle 22 configured to engage and support a portion of the handpiece 38 (see discussion below) when not in operation. For example, the shape of the cradle 22 may be complementary to contours of one or more portions of the handpiece 38, and may be designed to catch and support such complementary contours (e.g., by presenting a space narrower than a rotary knife housing 55, and larger than a handle 52, of the handpiece 38 into which the handle 52 may be inserted). Similarly, the power pack 10 may include a hanger bracket 24 attached to the housing 18 and configured to engage with and be supported by a suitable support structure (e.g., by a hook embedded in a nearby wall or a tower or stand for bearing the power pack 10).

One of ordinary skill will appreciate that a cradle 22 and/or hanger bracket 24 may be omitted or alternatively configured without departing from the scope of the present invention.

The power pack 10 may also include a flex-shaft quick connect 26. An output shaft or other output component for transferring power generated by the motor 12 may be made available for coupling at the quick connect 26. In one or more embodiments, the output of the motor 12 is transferred to the handpiece 38 via a cable or flex-shaft 28 releasably coupled to the quick connect 26.

The power pack may also include an ON button 30, an OFF button 32, and a wireless pairing button 34. The ON and OFF buttons 22, 32 may comprise push button switches or the like that, respectively, complete or break one or more electrical circuits providing electricity from the line power to the power pack components described herein (e.g., the motor 12, the power supply 14, the motor controller 16, and the RFID reader 20). One of ordinary skill will appreciate that a single button and/or switch may be utilized in lieu of separate ON and OFF buttons without departing from the spirit of the present invention.

Further, the wireless pairing button 34 may also comprise a switch that, when actuated, provides a signal to the controller 16 for initiating wireless pairing operations described in more detail below.

It is foreseen that the switches of one or more of the ON button 30, OFF button 32 and wireless pairing button 34 may be alternatively represented as a digital interface for receiving user input, such as a touchscreen display, without departing from the spirit of the present invention.

Figure 2:
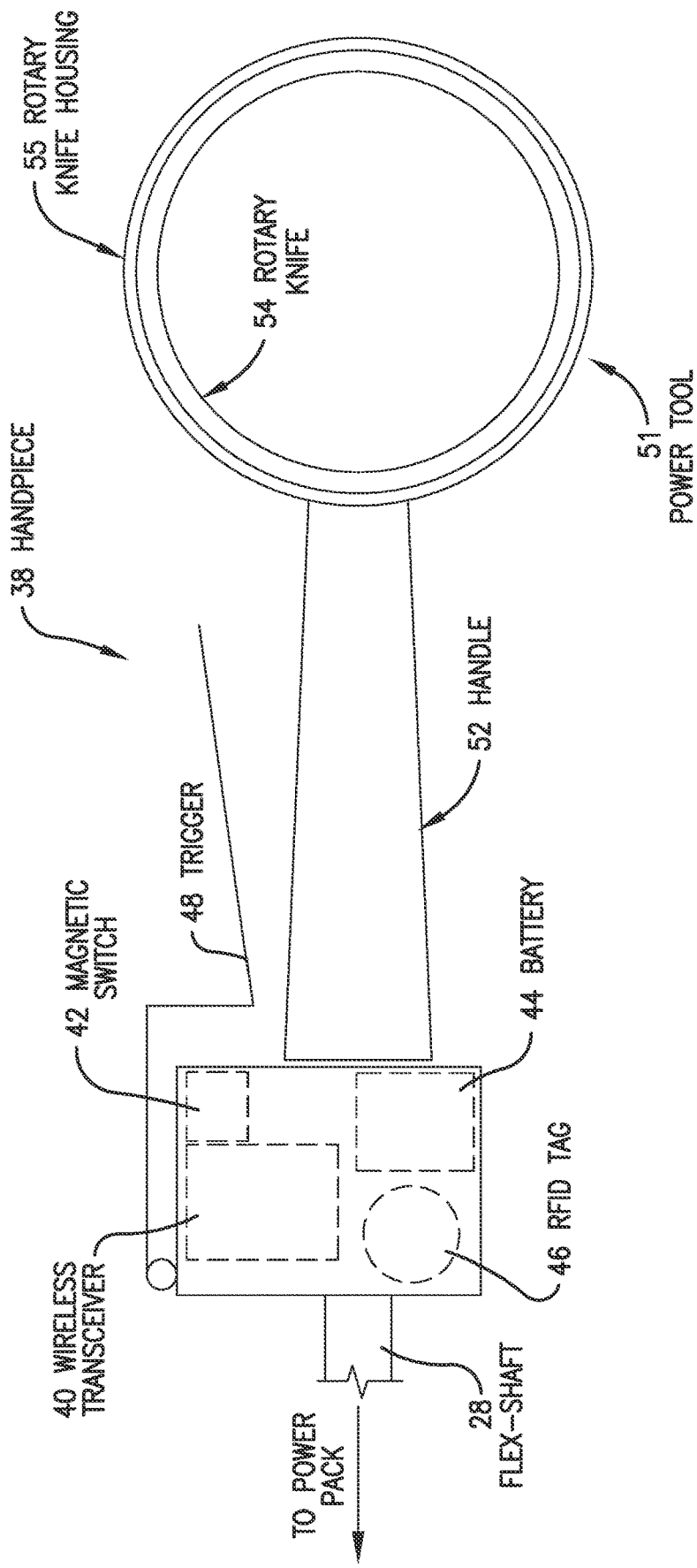
FIG. 2 illustrates, in schematic and block diagram form, components of a handpiece according to an embodiment of the present invention and a second end of the flex-shaft of FIG. 1, the handpiece being engaged with and driven by the power pack of FIG. 1.

Turning now to FIG. 2, the handpiece 38 may receive mechanical power transferred from the power pack 10 via the flex-shaft 28. The handpiece 38 may also include a wireless transceiver 40 configured to transmit wireless signals triggered by a magnetic switch 42, substantially as described above. The handpiece 38 may also include a battery 44 for powering the electronic components of the handpiece 38. The battery 44 may be rechargeable and may include and/or be in electronic communication with a port for receiving a universal serial bus (USB) connector 58 or plug for charging (see FIG. 5). In one or more embodiments, the wireless transceiver 40 may be configured to receive power from a wired or wireless power source other than the battery 44 if the battery voltage diminishes below a threshold for providing power to the handpiece. For example, the wireless transceiver may switch the power source from the battery 44 to the USB connector 58 upon connecting a power source to the USB connector 58.

The handpiece 38 may also include an RFID tag 46 for use in wireless pairing and related procedures discussed in more detail below. More generally, the handpiece 38 also includes a trigger 48 (including a magnet for actuating the switch 42 whenever the trigger 48 is depressed a threshold degree) and a power tool 51 comprising a high-speed knife including a handle 52, a rotary knife 54 and rotary knife housing 55 (see discussion above). The power tool 51 may include or comprise components of a power tool according to embodiments of the present invention that substantially conform to those corresponding components of a rotary knife described in U.S. Pat. No. 10,889,018, issued on Jan. 12, 2021, and entitled ROTARY KNIFE BLADE WITH DOUBLE BEVELED INSIDE SURFACE, the entire contents of which is hereby incorporated herein by reference. One of ordinary skill will appreciate, however, that various handpiece constructions are within the scope of the present invention.

Generally, it should be noted that the RFID components 20, 46 may communicate between one another using radio waves whereby digital data encoded in the RFID tag 46 may be captured by the RFID reader 20. The RFID reader 20 may capture digital data encoded in the RFID tag 46 when triggered by an electromagnetic interrogation pulse from the nearby RFID reader 20. In one or more embodiments, the wireless transceiver 40 may receive additional data (e.g., relating to configuration for further communications, encryption key data, or the like) from the wireless transceiver 48 after completion of a pairing process described in more detail below.

Figure 3:
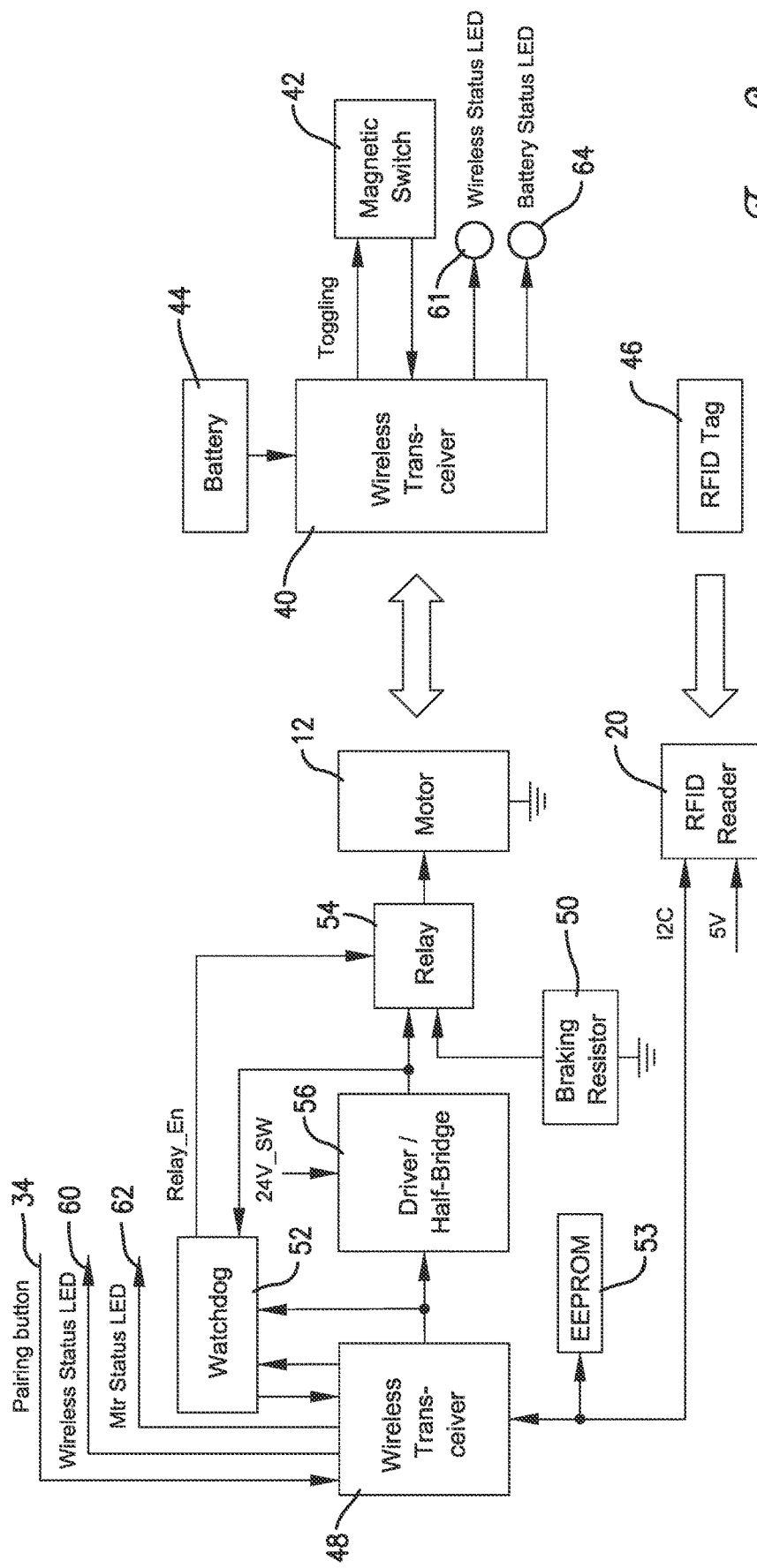
FIG. 3 illustrates, in schematic and block diagram form, signal and electrical flows across wired and wireless connections between components of the power pack and handpiece respectively of FIGS. 1 and 2.
Figure 4:
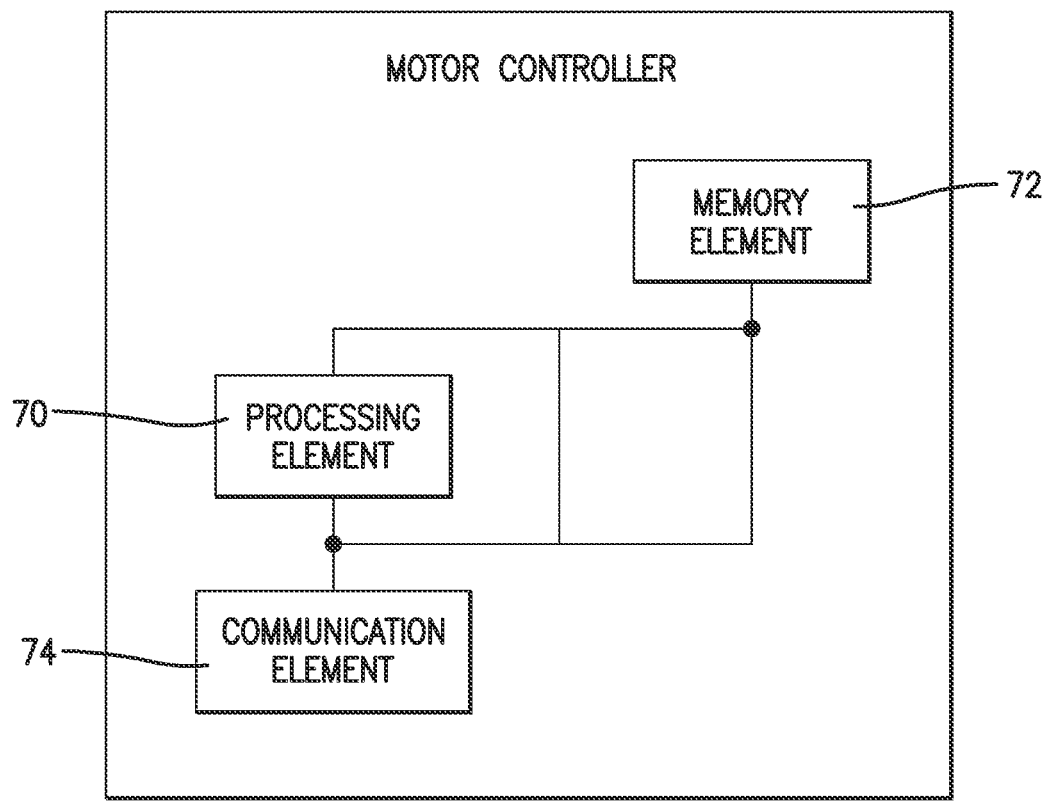
FIG. 4 illustrates, in block diagram form, components of the motor controller of FIGS. 1 and 3.
Figure 5:
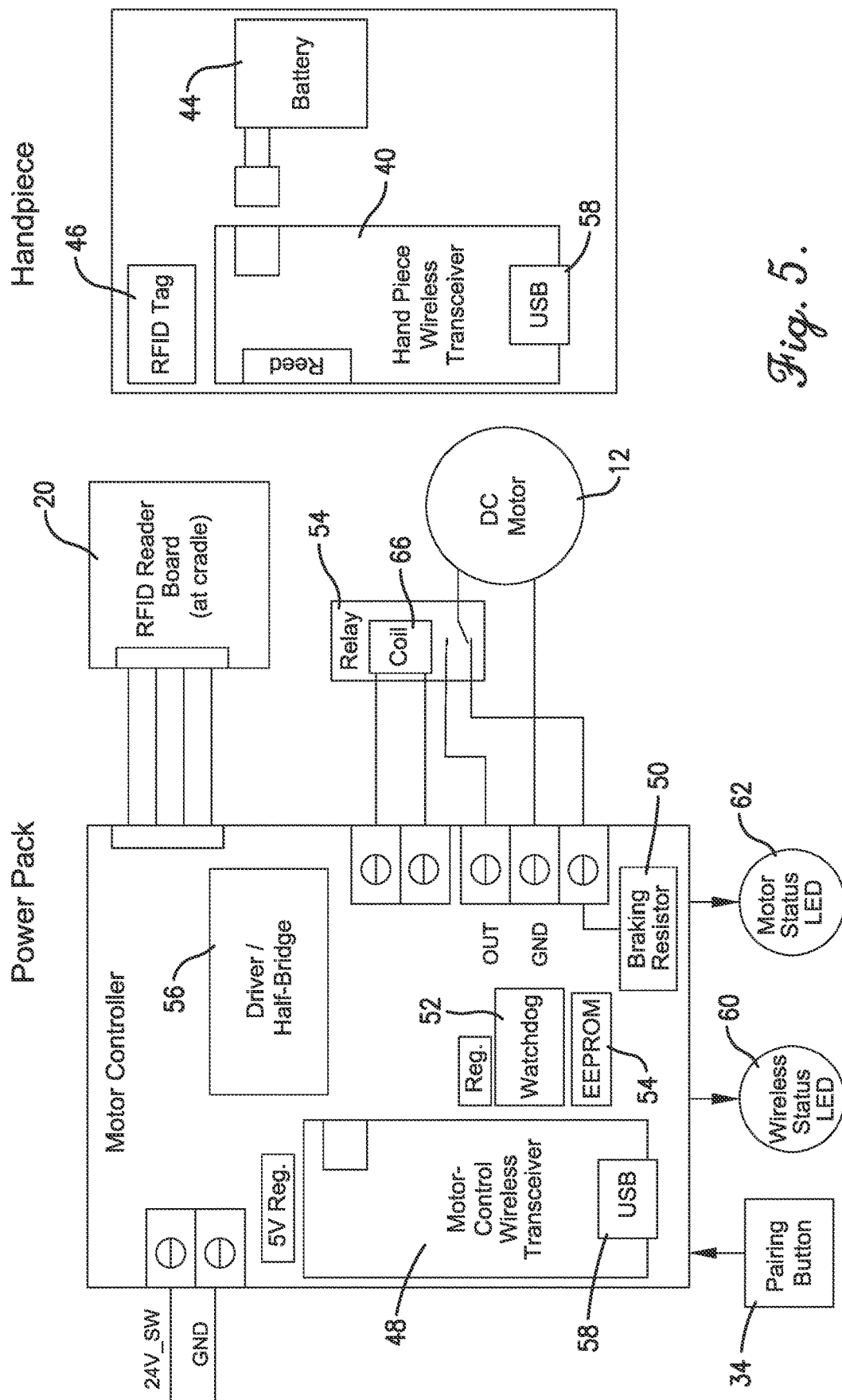
FIG. 5 illustrates, in schematic and block diagram form, circuit layouts for components of the power pack and handpiece respectively of FIGS. 1 and 2 according to an embodiment of the present invention.

Turning now to FIGS. 3-5, a variety of logical components of the power pack 10 and handpiece 38 are illustrated. Initially, it should be noted that the controller 16 may include a processing element 70, a memory element 72 and a communication element 74. The communication element 74 generally allows communication with other systems or devices, such as the handpiece 38, e.g., via wireless communication and/or data transmission over one or more direct or indirect radio links between devices. The communication element 74 may include signal or data transmitting and receiving circuits, such as antennas, amplifiers, filters, mixers, oscillators, digital signal processors (DSPs), and the like. The communication element 74 may establish communication wirelessly by utilizing RF signals and/or data that comply with communication standards such as cellular 2G, 3G, or 4G, WiFi, WiMAX, Bluetooth™, and the like, or combinations thereof. In addition, the communication element 74 may utilize communication standards such as ANT, ANT+, Bluetooth™ low energy (BLE), the industrial, scientific, and medical (ISM) band at 2.4 gigahertz (GHz), or the like.

In one or more particular embodiments, the wireless transceiver 48 and/or the RFID reader 20 may comprise or be integral with the communication element 74. Further, in one or more embodiments, the wireless transceivers 40, 48 and/or communication element 74 may individually or collectively include a software application for describing, executing, and enabling wireless communications, such as those transmitted in accordance with standards put forth by the Bluetooth Special Interest Group (SIG) under the mark BLUETOOTH™ as of the initial filing of the present application. One of ordinary skill will appreciate that pairing and wireless communication may be achieved according to other wireless communication standards and technologies without departing from the spirit of the present invention. In one or more embodiments, the wireless transceivers 40, 48 and communication elements 74 may use signals corresponding to one or more such wireless standard(s) to process, route, connect, establish, disconnect, or search for wireless signals between one or more devices, including to perform the operations described in more detail below.

The memory element 72 of the controller 16 may include non-volatile and/or non-transitory electronic hardware data storage components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, or combinations thereof. The memory element 72 may include, or may constitute, a "computer-readable medium." The memory element 72 may store the instructions, code, code segments, software, firmware, programs, applications, apps, modules, agents, services, daemons, or the like that are executed by the processing element 70, including a program configured to perform wireless pairing with the motor-control wireless transceiver 48, dynamic braking with a braking resistor 50, watchdog 52 operations, and other steps outlined herein. The memory element 72 may also store items described throughout this disclosure, such as operational parameters and readings outlined herein. In the illustrated embodiment, the memory element 72 comprises electrically erasable programmable read-only memory (EEPROM) 53.

The processing element 70 of the controller 16 may include electronic hardware components such as processors. The processing element 70 may include digital processing unit(s). The processing element 70 may include microprocessor(s) (single-core and multi-core), microcontrollers, digital signal processors (DSPs), field-programmable gate arrays (FPGAs), analog and/or digital application-specific integrated circuits (ASICs), or the like, or combinations thereof. The processing element 70 may generally execute, process, or run instructions, code, code segments, software, firmware, programs, applications, apps, modules, agents, processes, services, daemons, or the like, including the program configured to perform the wireless pairing, dynamic braking and watchdog operations outlined herein. The processing element 70 may also include hardware components such as finite-state machines, sequential and combinational logic, and other electronic circuits that can perform the functions necessary for the operation of the current invention. The processing element may be in communication with the other electronic components through serial or parallel links that include address busses, data busses, control lines, and the like. Through hardware, software, firmware, or combinations thereof, the processing element 70 may be configured or programmed to perform operations described elsewhere herein.

Other components of the exemplary controller 16 illustrated in FIG. 3 include a braking resistor 50, a relay 54, and a driver/half-bridge 56. The driver/half-bridge 56 receives converted twenty-four volt (24V) power and responds to input from the controller 16 to vary (and manage the polarity of) electrical feed to the motor 12 according to control algorithm(s). For example, the controller 16 may be configured to vary output from the electric motor 12 based at least in part on a user's input. In one or more embodiments, the output may vary in response to, for example, the strength of signal generated by the magnetic switch 42 (i.e., the user's input) which, in turn, may depend on the proximity of the trigger 48 (i.e., on how much the user depresses the trigger 48). Moreover, in one or more embodiments, the controller 16 may be configured to match the motor back electromotive force (EMF) to the controller output ramp to avoid initial dynamic braking and minimize stress on the controller 16. The controller 16 and/or driver/half-bridge 56 may implement pulse width modulation (PWM) for powering the motor 12. It should be noted that a variety of motor control strategies may be implemented without departing from the spirit of the present invention.

The relay 54 includes a switch responsive to input from the watchdog 52 component or logic of the controller 16. The watchdog 52, discussed in more detail below, at least in part determines whether the relay 54 is to remain open or closed (thereby, respectively, cutting off or permitting the flow of power from the driver/half-bridge 56 to the motor 12).

The braking resistor 50 comprises a power resistor used in dynamic braking of the motor 12. The braking resistor 50 may be configured such that the motor 12 is slowed at variable rates depending on the resistance of the braking resistor 50. More particularly, when the motor 12 is to be slowed down or stopped, kinetic energy of the motor may be transformed into electrical energy which may be dissipated as heat using the (preferably rheostatic) braking resistor 50.

Further, it should be noted that the control functions carried out by the controller 16 may be implemented via a wide variety of electronic components without departing from the spirit of the present invention.

Moreover, referring to FIG. 1, the RFID reader 20 is illustrated as being positioned in proximity to or integral with the cradle 22, such that the operational range of the RFID reader 20 encompasses the cradle 22 and/or that portion of the cradle 22 that is configured to receive the handpiece 38. In this manner, bringing the RFID tag 46 proximate to or into contact with the cradle 22 also brings the RFID tag 46 near the RFID reader 20, enabling pairing operations described in more detail below.

One of ordinary skill will appreciate that the RFID tag 46 may be positioned inside the rotary knife housing 56 without departing from the spirit of the present invention. Moreover, the rotary knife housing 56 may be constructed to provide partial or complete protection from and isolation against ingress of water and/or environmental contaminants.

In addition, it should be noted that the preferred embodiment includes several status indicator lights embedded respectively in the powerpack housing 18 and housing of the handpiece 38 (e.g., wireless status LED 60, wireless status LED 61, motor status LED 62, battery status LED 64 or the like).

The system may include additional, less, or alternate apparatuses or components, including those discussed elsewhere herein and/or in the other Figures attached hereto.

Exemplary Method for Wireless Control of Powered Hand Tool

Figure 6:
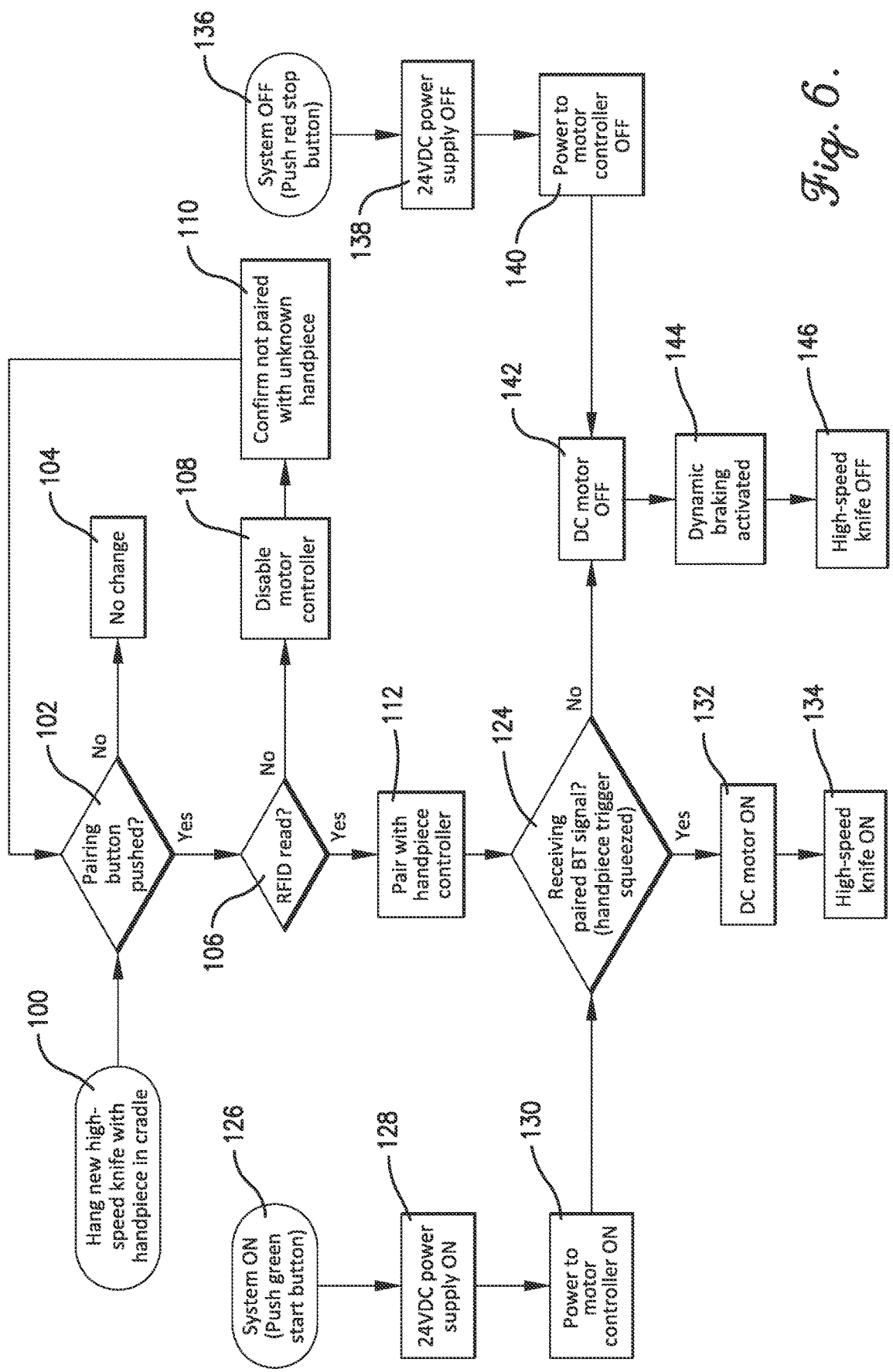
FIG. 6 is a flowchart illustrating at least a portion of the steps for controlling a handpiece in accordance with embodiments of the present invention.

FIG. 6 depicts a block flow diagram associated with exemplary computer-implemented methods for pairing, using and wirelessly controlling handpiece power tools. Some steps may be performed concurrently as opposed to sequentially and may in some cases be performed in a different order. In addition, some steps may be optional. The computer-implemented method(s) are described below, for ease of reference, as being executed by exemplary devices and components introduced with the embodiments illustrated in FIGS. 1-5. For example, the steps of the computer-implemented method(s) may be performed by the power pack and handpiece illustrated therein and described above, at least in part through the utilization of processors, transceivers, hardware, software, firmware, or combinations thereof. In one or more embodiments, the steps set out below for a single handpiece and power pack are substantially repeated in connection with pairing, using and wirelessly controlling a plurality of other powered handheld knives within the same general vicinity or at the same premises. A person having ordinary skill will also appreciate that responsibility for all or some of such actions may be distributed differently among such devices or other computing devices without departing from the spirit of the present invention.

One or more computer-readable medium(s) may also be provided. The computer-readable medium(s) may include one or more executable programs, such as a controller program, stored thereon, wherein the program(s) instruct one or more processing elements to perform all or certain steps outlined herein. The program(s) stored on the computer-readable medium(s) may instruct the processing element(s) to perform additional, fewer, or alternative actions, including those discussed elsewhere herein.

Referring to step 100, a user may place a handpiece comprising a powered rotary knife on a cradle of a power pack. A motor controller may sense the proximity of a wireless transceiver or RFID tag of the handpiece (e.g., via an RFID reader and/or a motor-control wireless transceiver, or by otherwise detecting that the handpiece has been placed on a cradle of the power pack), and the proximity may trigger or serve as a precondition for wireless pairing processes. A pairing button of the motor controller may also or alternatively be pushed to trigger or serve as a precondition for pairing of the handpiece to the power pack, as discussed in more detail below. One of ordinary skill will appreciate that a variety of wireless signals containing handpiece identification data may be used for pairing the new handpiece with the power pack. The wireless pairing signals may be received by the motor-control wireless transceiver upon placing the new handpiece inside of the cradle on the power pack.

Referring to step 102, the pairing button of the motor controller may be pressed. In the illustrated embodiment, the motor controller detects or determines whether the pairing button has been pushed. In an embodiment, such a determination may include determining whether the pairing button or switch is presently active or has been activated within a pre-determined time period.

Referring to step 104, the pairing process may not proceed and/or may be terminated if the determination at step 102—relating to the motor controller deciding whether the pairing button has been pushed—is "No."

Referring to step 106, if, alternatively, the determination at step 102 is "Yes," the motor controller may determine if one or more RFID tag(s) is/are read. In one or more embodiments, the motor controller activates the RFID reader to receive signals from the RFID tag(s) in connection with making the determination at step 106.

Referring to step 108, if no RFID tag signal is read/detected at step 106, or the pairing process is otherwise terminated for failure to satisfy a condition thereof, the motor controller or its capacity for initiating supply of power to the motor may be disabled. Moreover, referring to step 110, in such cases the motor controller may also confirm that it is not wirelessly paired with an unknown handpiece (i.e., one for which an RFID tag signal does not match the RFID signal of a previously paired handpiece and/or for which a complete wireless pairing process has not otherwise been completed) as a condition for resetting the motor controller for a future pairing process. After confirming that the motor controller is not wirelessly paired with the unknown handpiece at step 110, the motor controller may cycle back to again deciding if the pairing button has been pushed, at step 102.

Referring to step 112, if an RFID tag signal is read/detected at step 106, the motor controller may proceed by pairing with the corresponding handpiece. In one or more embodiments, the pairing process may include writing unique information regarding the handpiece to memory (e.g., to the EEPROM of the motor controller). For example, the RFID reader may adhere to near field communication (NFC) protocols, and the handpiece RFID tag signal may include credentials or unique identifying information for the handpiece and/or wireless transceiver embedded in the handpiece. In this manner, the RFID signal may uniquely identify the handpiece to the motor controller, and such unique identifying information may be stored at the motor controller and/or utilized to complete wireless pairing between the handpiece and the motor controller.

In one or more embodiments, all, or some of the information in the RFID tag signal may be used in security applications, for example in establishing encryption keys or the like for securing wireless communications between the handpiece and the motor controller.

In one or more embodiments, the pairing process may also include establishment of associated encryption protocols and keys for use in secure wireless communications between the handpiece and the motor controller. It should also be noted that the pairing of the handpiece to the power pack is preferably persistent. In one or more embodiments, the pairing is retained in the memory element of the controller unless and until it is overwritten via a new pairing procedure (e.g., pairing to a new handpiece), and regardless of whether electronic components of the power pack or handpiece and/or power to the motor are turned off.

One of ordinary skill will appreciate that, in one or more embodiments, the motor controller may first validate a single RFID tag signal against one or more conditions before completing the pairing process. Moreover, one of ordinary skill will appreciate that receipt of multiple RFID tag signals during the pairing process outlined above may prompt a user to select one such RFID tag (or handpiece) for pairing and/or may result in termination of the pairing process.

If at least one handpiece has been properly identified to the motor controller via an RFID tag signal, the motor controller may complete secure wireless pairing with the handpiece in connection with step 112.

Referring to step 124, the motor controller may determine whether it is receiving a paired wireless signal from the handpiece wireless transceiver. In one or more embodiments, such a signal is received whenever a magnetic switch at the handpiece is activated by, for example, squeezing a magnet-containing trigger of the paired handpiece as discussed in more detail above.

Referring to step 126, in one or more embodiments, the motor controller is in an "ON" state and a sequence for using the paired handpiece includes activating or turning "ON" a power supply, as portrayed in step 128. Referring also to step 130, the power supply may provide power to the motor controller. One skilled in the art will appreciate that in addition to providing power to the motor controller, the power supply may also power the motor controller differently, for example via AC line power. One or more of steps 126, 128, 130 may serve as logical or physical preconditions—in addition to confirmation of receipt of a paired wireless signal at step 124—required to be satisfied before proceeding to step 132, described in more detail below.

Referring to step 132, if the motor controller is receiving a paired wireless signal from a handpiece, the motor controller may cause its associated electronic components (e.g., a driver/half-bridge and/or relay circuit) to supply power from the power supply to the motor, causing the motor to be operational and/or in an "ON" and operating state. As noted above, in one or more embodiments, one or more of steps 126, 128 and 130 may serve as additional logical or physical preconditions to be satisfied to reach step 132 and the "ON" state. Referring to step 134, a DC motor being in the "ON" state may result in rotation of a flex-shaft or other drivetrain component and consequent operation of the handpiece (e.g., operation of a high-speed knife of the handpiece).

Generally, it should be noted that a "DC motor ON" process in step 132 may only be reached in embodiments of the present invention if a paired wireless signal is being received concurrently (see step 124). As noted above, in one or more embodiments, such a signal is received as a result of activation of a magnetic switch on a handpiece by, for example, squeezing a proximate, corresponding trigger. The switch may comprise a Hall effect sensor or another sensor configured to respond to and be activated by a threshold degree of proximity of a magnet or ferromagnetic element(s) of the trigger.

Referring to step 136, an "OFF" condition for the motor may be reached if a "System OFF" input is received by the motor controller (e.g., through activation of a corresponding switch/button by a user). Where such input is received by the motor controller, the power supply may be correspondingly turned off or retained in an off state at step 138. Referring to step 140, the power to the motor controller may likewise be cut when the power supply is turned off or retained in an off state at step 138.

Referring to step 142, if the motor controller is not receiving a paired wireless signal from the handpiece, the associated electronic components (e.g., the driver/half-bridge and/or relay circuit) of the motor controller will not supply power to the motor, resulting in the motor being in an "OFF" condition.

One or more of steps 136, 138 and 140 may serve as additional or alternative logical or physical preconditions which, if satisfied, lead to or cause the "DC Motor Off" state of step 142.

Referring to step 144, in conditions where the motor controller determines or physical conditions require that the motor should reduce output or be switched from operation into an "OFF" condition, dynamic braking (e.g., via a braking resistor discussed in more detail above) may be used to slow the motor. For example, in connection with cutting power to the leads of a motor with a moving armature, the motor controller may close a relay circuit to complete a circuit for flow of electricity between the motor to a braking resistor and dissipation of energy by the braking resistor (e.g., as heat). It should be noted that a circuit loop may also be added between the braking resistor and the motor. Once the motor output halts, the handpiece will cease operation, as noted in step 146.

Figure 7:
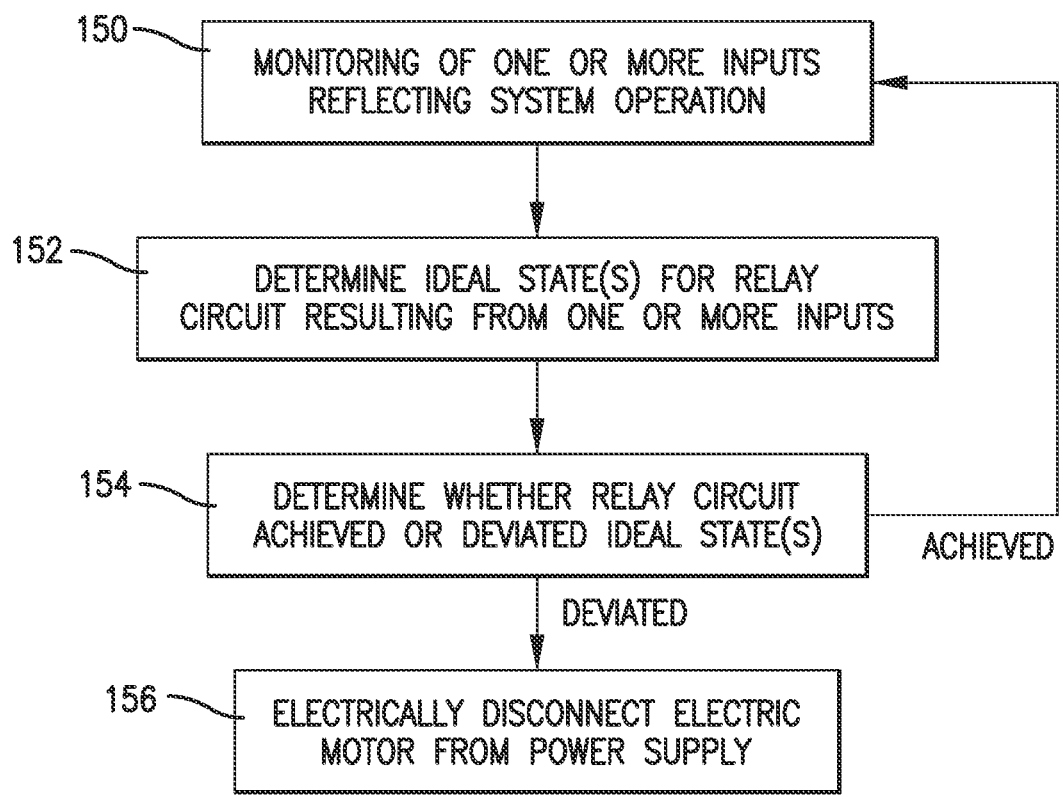
FIG. 7 is a flowchart illustrating at least a portion of the steps for monitoring one or more inputs reflecting system operation in accordance with embodiments of the present invention.

Turning now to FIG. 7, a motor controller of a power pack may alternatively or additionally implement a watchdog failsafe mode or algorithm in one or more embodiments for controlling operation of a handpiece driven by the power pack. The watchdog algorithm may cause continuous or intermittent monitoring of one or more inputs reflecting system operation in step 150, determine an ideal state for a relay circuit of the motor controller that should result from the one or more inputs at any given time in step 152, and determine whether the relay circuit achieved or deviated from the ideal state(s) in step 154. The watchdog algorithm may also, based on the determination of deviation, cause the switch to electrically disconnect the electric motor from the power supply in step 156. In one or more embodiments, the relay circuit states are binary, i.e., the relay circuit is either normally open or normally closed (i.e., motor "ON" or "OFF," respectively), and the motor controller will determine whether the relay circuit is operating in the intended manner.

In one or more embodiments, the relay circuit is activated to a first or second state corresponding to the state of the electric motor. For example, the relay circuit may activate to the first state (corresponding to motor "ON"), in which the relay circuit may electrically connect the electric motor to the power supply. When the electric motor is connected to the power supply, the relay circuit may be open. In another example, the relay circuit may activate to the second state (corresponding to motor "OFF"), in which the relay circuit may electrically disconnect the electric motor from the power supply (in which case, the relay circuit may instead electrically connect the electric motor to the braking resistor). When the electric motor disconnects from the power supply, the relay circuit may be closed.

Referring again to step 154, the determination of deviation may include determining that portions of the input data generated by an electrical component of the power pack are insufficient to establish normal operation. For example, such input data may be insufficient due to a system failure to communicate between one or more components. In another example, such input data may be insufficient to establish normal operation because the input data became corrupt during the transmission of the input data between components.

In one or more embodiments, the watchdog algorithm may be implemented in connection with the steps for wireless control described above and may represent an integral or independent condition or set of conditions leading to the DC Motor OFF step 142 described above.

Determining an ideal state for the relay circuit at any given moment in time may include analyzing the one or more inputs against one or more conditions. For example, in one or more embodiments, the ideal state of a relay circuit will not permit the motor to operate at one hundred percent (100%) duty cycle.

For another example, control signals to a driver/half-bridge of the power pack, and an output level of the driver/half-bridge, may be monitored. The failsafe watchdog algorithm may determine at any given time that the level of output is not close enough (i.e., within a pre-determined threshold) to what should have resulted from corresponding control signal(s) recorded by the controller. Accordingly, the algorithm may determine an ideal state and deviation therefrom. Namely, the algorithm may determine that, at a given time or within a given timeframe, the relay circuit did not achieve its ideal state(s) and should have been closed for failure of sufficient output from the driver/half-bridge.

For still another example, receipt of paired wireless signals and the status of the relay circuit may be monitored. The failsafe watchdog algorithm may determine at any given time that the relay circuit was open when corresponding wireless signals were not received, and/or that the relay circuit was closed when corresponding wireless signals were received. Accordingly, the algorithm may determine an ideal state and deviation therefrom. Namely, the algorithm may determine that, at a given time or within a given timeframe, the relay circuit did not achieve its ideal state(s) based on the paired wireless signals received by the motor controller.

Wherever the failsafe watchdog algorithm determines that the relay circuit did not achieve one or more ideal state(s), it may direct that power to the motor be cut off or that the relay circuit be closed, and/or may otherwise cease operations of the motor and/or handpiece (see step 156).

The ideal state may be a threshold for permitted deviation of the power supply output (from the motor) level from a corresponding output specified in the control signals governing the power supply. It should be noted that one or more ideal states(s) of the relay circuit may be based at least in part by a pre-defined state. A pre-defined state may be a set of conditions, operational data, identification information, or the like relating to the relay circuit, or an ideal state previously used by the hand piece.

In addition, one or more ideal state(s) of the relay circuit may at least in part comprise a variable ideal state. The variable ideal state may change based at least in part on the gradual, normal wear-and-tear-related changes experienced by a handpiece over long usage, and the corresponding changes to expected values for measured variables over that time. Other factors that might lead to or inform a variable ideal state may include connection duration between the hand piece and the power pack and/or motor operation duration. In one or more preferred embodiments of the invention, the relay circuit may be configured to transmit a signal indicative of a current relay state to at least one processor of the motor controller.

It should also be noted that one or more ideal state(s) may represent an ideal range of values for one or more data types or relationships between values of two or more data types. Data types may include power supply output level, control signals to the power supply, indicators of the ideal state for the relay circuit, motor operation duration, timestamps pertaining to the use of one or more components, records of paired wireless communication signals, or associated ideal state(s). One skilled in the art will appreciate that additional data types or relationships between data types may be used to determine one or more ideal state(s) without departing from the spirit of the invention.

The preferred forms of the invention described above are to be used as illustrations only and should not be utilized in a limiting sense in interpreting the scope of the present invention. Obvious modifications to the exemplary embodiments, as hereinabove set forth, could be readily made by those skilled in the art without departing from the spirit of the present invention.

ADDITIONAL CONSIDERATIONS

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as transceiver elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The patent claims at the end of this patent application are not intended to be construed under 35 U.S.C. § 112(f) unless traditional means-plus-function language is expressly recited, such as "means for" or "step for" language being explicitly recited in the claim(s).

Although the invention has been described with reference to the embodiments illustrated in the attached drawing figures, it is noted that equivalents may be employed, and substitutions may be made herein without departing from the scope of the invention as recited in the claims.

Having thus described various embodiments of the invention, what is claimed as new and desired to be protected by the inventor(s) includes the following:

We claim:

1. A power pack for a power tool, the power pack comprising:
   an electric motor configured for driving engagement with the power tool;
   a motor controller including a relay circuit in electrical communication with the electric motor, the relay circuit comprising a switch selectively electrically connectable to a power supply, whereby electrical connection of the electric motor to the power supply powers the electric motor; and
   non-transitory computer-readable storage media having computer-executable instructions for monitoring operation of the power pack stored thereon, wherein when executed by at least one processor the computer-executable instructions cause the at least one processor to—
      determine an ideal state of operation of the power pack, said ideal state defining, for one or more data types represented in the input data, at least one of the following: an ideal range of values for the one or more data types, and a relationship between values of two or more of the one or more data types
      monitor input data relating to operation of the power pack,
      determine, based at least in part on the input data, that operation of the power pack deviated from the ideal state, based on the determination of deviation, cause the switch to electrically disconnect the electric motor from the power supply.

2. The power pack of claim 1, said power supply being supplied via at least one of a driver and a half-bridge converter.

3. The power pack of claim 1, said one or more data types including power supply output level, control signals to the power supply, and indicators of the ideal state of the relay circuit, said ideal state including— a threshold for permitted deviation of the power supply output level from a corresponding output specified in the control signals to the power supply, pre-defined states of the relay circuit that correspond to operation within and outside of the threshold.

4. The power pack of claim 3, said input data of the one or more data types including corresponding timestamps.

5. The power pack of claim 1, said one or more data types including motor operation duration, said ideal state including— a pre-determined duty cycle for motor operation, pre-defined states of the relay circuit that respectively correspond to the motor operation duration being in compliance with and outside of the pre-determined duty cycle.

6. The power pack of claim 1, said one or more data types including records of paired wireless communication signals received from the power tool, said ideal state including— pre-defined states of the relay circuit that respectively correspond to time periods in which the paired wireless communication signals are received and in which the paired wireless communication signals are not received.

7. The power pack of claim 1, further comprising a braking resistor electrically connectable to the relay circuit, whereby electrical connection of the electric motor to the braking resistor permits electrical energy from the electric motor to be dissipated by the braking resistor at least partly in the form of heat.

8. The power pack of claim 1, further comprising a housing, said relay circuit being co-located with the electric motor within said housing.

* * * * *